United States Patent
Rai Kurlethimar et al.

(10) Patent No.: US 11,442,543 B1
(45) Date of Patent: Sep. 13, 2022

(54) ELECTRONIC DEVICES WITH MONOCULAR GAZE ESTIMATION CAPABILITIES

(71) Applicant: Apple Inc., Cupertino, CA (US)

(72) Inventors: Yashas Rai Kurlethimar, Sunnyvale, CA (US); Giovanni Carbone, Palo Alto, CA (US); Milad Akhlaghi Bouzan, Santa Clara, CA (US); Nicolas P. Bonnier, Campbell, CA (US); William W. Sprague, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/543,171

(22) Filed: Dec. 6, 2021

Related U.S. Application Data

(60) Provisional application No. 63/143,464, filed on Jan. 29, 2021.

(51) Int. Cl.
  *G06F 3/01* (2006.01)
  *G02B 27/00* (2006.01)
  *G06T 19/00* (2011.01)
  *G02B 27/01* (2006.01)
  *G06T 7/50* (2017.01)

(52) U.S. Cl.
  CPC ......... *G06F 3/013* (2013.01); *G02B 27/0093* (2013.01); *G02B 27/0101* (2013.01); *G02B 27/017* (2013.01); *G02B 27/0179* (2013.01); *G06T 7/50* (2017.01); *G06T 19/006* (2013.01);
  (Continued)

(58) Field of Classification Search
  CPC . G06F 3/013; G02B 27/0093; G02B 27/0101; G02B 27/017; G02B 27/0179; G02B 2027/0138; G02B 2027/0185; G06T 7/50; G06T 19/006
  See application file for complete search history.

(56) References Cited

U.S. PATENT DOCUMENTS

| 8,964,298 B2 | 2/2015 | Haddick et al. |
| 9,370,302 B2 | 6/2016 | Krueger |

(Continued)

OTHER PUBLICATIONS

Miardanbegi et al., Monocular Gaze Depth Estimation using the Vestibulo-Ocular Reflex, 2019 Symposium on Eye Tracking Research and Applications, Jun. 2019, New York, United States.

*Primary Examiner* — Bryan Earles
(74) *Attorney, Agent, or Firm* — Treyz Law Group, P.C.; G. Victor Treyz; Tianyi He

(57) ABSTRACT

A head-mounted display may display images in eye boxes. Right and left gaze tracking sensors may gather left eye gaze information from a left eye box and right eye gaze information from a right eye box. During operation in a first mode in which the right and left gaze tracking sensors are not impaired, gaze information from the right and left gaze tracking sensors may be used in presenting foveated and distortion-corrected image content on the displays and/or in otherwise operating the left and right displays. During operation in a second mode in which one of the gaze tracking sensors is impaired, gaze information for the impaired sensor may be estimated from gaze information for the unimpaired sensor in combination with an object depth estimate based on depth buffer information, vestibulo-ocular-reflex gain information, and historical information.

22 Claims, 3 Drawing Sheets

(52) U.S. Cl.
CPC ............... *G02B 2027/0138* (2013.01); *G02B 2027/0185* (2013.01)

(56) References Cited

U.S. PATENT DOCUMENTS

| | | | |
|---|---|---|---|
| 9,514,364 B2 * | 12/2016 | Sheng | G06V 40/193 |
| 9,775,512 B1 | 10/2017 | Tyler et al. | |
| 10,231,614 B2 | 3/2019 | Krueger | |
| 10,514,546 B2 | 12/2019 | Eash et al. | |
| 11,238,340 B1 * | 2/2022 | Anderson | G02B 27/0093 |
| 2015/0097772 A1 * | 4/2015 | Starner | G02B 27/017 345/158 |
| 2015/0277123 A1 | 10/2015 | Chaum et al. | |
| 2020/0225742 A1 * | 7/2020 | Krishnakumar | G02B 27/0093 |
| 2020/0310164 A1 | 10/2020 | Gupta et al. | |
| 2021/0173474 A1 * | 6/2021 | Sztuk | G06F 3/013 |
| 2021/0345923 A1 * | 11/2021 | Fogelström et al. | A61B 5/18 |
| 2022/0011858 A1 * | 1/2022 | Li | G06F 3/013 |
| 2022/0083134 A1 * | 3/2022 | Kassner | G06F 3/013 |

* cited by examiner

ELECTRONIC DEVICES WITH MONOCULAR GAZE ESTIMATION CAPABILITIES

This application claims the benefit of provisional patent application No. 63/143,464, filed Jan. 29, 2021, which is hereby incorporated by reference herein in its entirety.

FIELD

This relates generally to electronic devices, and, more particularly, to head-mounted electronic devices.

BACKGROUND

Electronic devices often have displays. Head-mounted devices may be used to display virtual reality content or augmented reality content for users.

SUMMARY

An electronic device such as a head-mounted device may be provided with displays. A left display may present a left image through a left lens to a left eye box and a right display may present a right image through a right lens to a right eye box. Right and left gaze tracking sensors may gather left eye gaze information from the left eye box and right eye gaze information from the right eye box, respectively.

During operation in a first mode in which the right and left gaze tracking sensors are not impaired, gaze measurements from the right and left gaze tracking sensors may be used in determining the direction of the user's gaze and the point-of-gaze of the user in three dimensions. This gaze information may be used in presenting foveated and distortion-corrected image content on the displays and/or in otherwise operating the left and right displays.

During operation in a second mode in which one of the gaze tracking sensors is impaired, gaze information for the impaired sensor may be estimated from gaze information for the unimpaired sensor in combination with an object depth estimate based on depth buffer information, vestibulo-ocular-reflex gain information, and historical eye movement information of either/both eyes.

DETAILED DESCRIPTION

Figure 1:
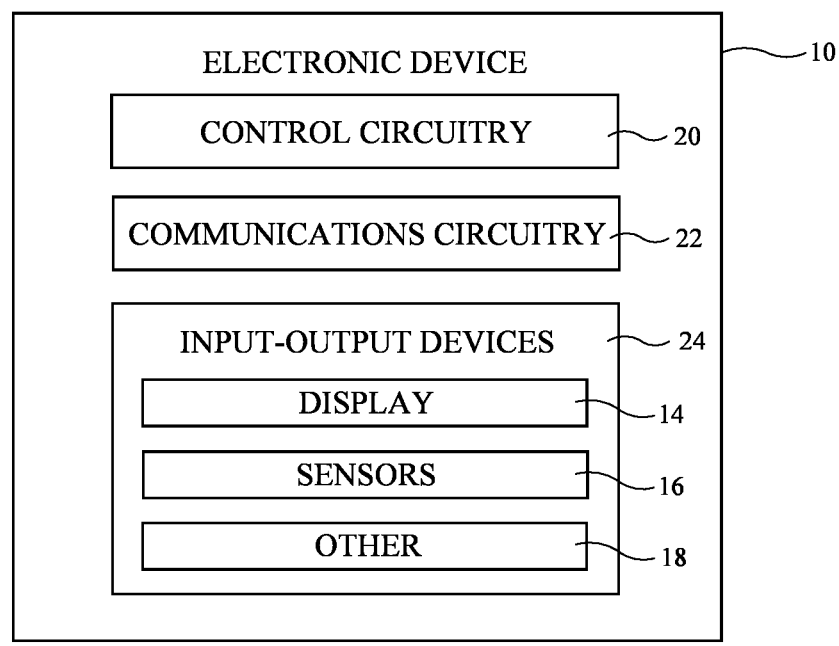
FIG. 1 is a schematic diagram of an illustrative electronic device in accordance with an embodiment.

Electronic devices such as head-mounted devices may be provided with displays. Head-mounted support structures allow head-mounted devices to be worn on the heads of users. During operation, the displays in a head-mounted device provide visual content for a user.

A head-mounted device may use gaze trackers to track the gaze (e.g., the direction of view) of a user's left and right eyes. Gaze tracker output can be used to dynamically enhance display resolution in the direction of the user's gaze (sometimes referred to as display foveation) and to perform dynamic geometric compensation operations for displayed images.

Due to issues that are sometimes unavoidable (e.g., due to momentary operation system and/or thread throttling, camera output glitches, eye relief changes, light-seal changes, device movement, user eyeglass usage and/or eye physiology changes, etc.) gaze tracking sensors may sometimes lose signal. As a result, it may be desirable to allow a head-mounted device to operate momentarily using only the gaze sensor output from a single gaze sensor rather than output from a pair of gaze sensors. This can be done by gathering and processing gaze-related information from multiple sources and using this information in conjunction with gaze information from the operative sensor to estimate the gaze tracker output of the momentarily disabled gaze tracker.

In normal operation, when two gaze trackers are being used (one for the user's left eye and one for the user's right eye), the gaze of the user can be determined based on the gaze tracking data gathered from each eye. Control circuitry in the head-mounted device can use The gaze data from the two sensors to determine the direction of the user's gaze and the point in three-dimensional space that the user is viewing (sometimes referred to as the point of gaze).

Consider, as an example, a first scenario in which a user is looking at a nearby object that is directly in front of the user. The left eye in this scenario will rotate to the right and the right eye will rotate by an equal amount to the left. Even though the left eye is rotated to the right and is not pointing directly forward, the location of the object on which the user's gaze is resting in this scenario is directly in front of the user.

In a second scenario, the user may be viewing an object on the horizon that is slightly to the right of center such that the viewpoint associated with the object of the first scenario, the object on the horizon, and the left eye all light along a straight line. In this second scenario, both the user's right and left eyes may be rotated to the right.

So long as both gaze trackers in the head-mounted device are operative and providing valid output, the control circuitry of the device can differentiate between these two scenarios. In the event that the output from the right gaze tracker is lost, however, the control circuitry cannot rely only on the left gaze tracker output to distinguish between the first scenario (object directly in front of the user and nearby) from the second scenario (object located at infinity to the right of the user), because the three points (either viewpoint) and the left eye are all along a straight line—so the left eye performs the same amount of rotation in either scenario.

To ensure that the head-mounted device can operate satisfactorily even if the output of one of the gaze trackers is momentarily lost, the control circuitry can gather and process information such as depth buffer information, vestibulo-ocular reflex (VOR) information, and historical gaze information. Using this information in combination with data from the remaining operative gaze tracking sensor, the control circuitry may (at least for a period of time) estimate the distance of objects being viewed by the user and associated values for the output of the momentarily disabled gaze tracker and thereby estimate the direction of the user's gaze and the point-of-gaze (which involves knowledge of the distance of the point-of-gaze to the user as well as the gaze direction). As an example, depth buffer information, VOR information, and historical information on the fixation distance of the user may be used in estimating the distance of an object being viewed by a user. The estimated object information may then be used to differentiate between the foregoing first and second scenarios (object nearby and object located at infinity, respectively).

The distance between the user (e.g., the eyes of the user) and a real-life object corresponds to the physical distance between the object and the user. When virtual reality content is being displayed for a user using displays in a head-mounted device, the distance between an object being viewed and the user corresponds to the depth of the user in a computer-generated image that is being displayed for the user. Computer-generated content (sometimes referred to as virtual content) may be displayed in the absence of other content or may be overlaid onto camera images of the real-world. In augmented reality systems, real-world image light may be combined with computer-generated images (e.g., using an optical combiner). The distance (depth in a viewed image) of a virtual object from a user can be determined from the depth buffer of the display system being used to display the virtual object (e.g., the display depth buffer in a head-mounted device's control circuitry). The distance of real-world objects may be determined using depth sensors or other distance sensors mounted on the front of the head-mounted device.

In addition to determining the distance of objects using depth buffer data and/or distance sensor information, control circuitry in a head-mounted device may analyze VOR information and historical gaze information (historical information on which objects a user's gaze has recently been fixed on). These inputs may be combined with real-time gaze tracker readings from the single remaining operative gaze tracker to estimate the current point-of-gaze of the user. Operations such as display foveation operations and image distortion correction operations may then be performed without interruption.

FIG. 1 is a schematic diagram of an illustrative head-mounted device. Head-mounted device 10 may be operated in a system with one or more electronic devices. For example, head-mounted device 10 may receive video and/or other content from a companion device (e.g., a cellular telephone, tablet computer, laptop computer, desktop computer, etc.) or device 10 may be a stand-alone head-mounted device. Configurations in which device 10 is a stand-alone head-mounted device such as a pair of virtual reality goggles, a pair of augmented reality glasses, or other device with displays that is worn on a user's head (e.g., a hat, helmet, etc.) may sometimes be described herein as an example.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, display control circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include displays such as display 14. Display 14 may include a left display panel (sometimes referred to as a left display or left display portion) that provides a left image for the user's left eye and a right display panel (sometimes referred to as a right display or right display portion) that provides a right image for the user's right eye. Display 14 may be an organic light-emitting diode display, a liquid crystal display, an electrophoretic display, an electrowetting display, a plasma display, a microelectromechanical systems display, a display projector, a display having a pixel array formed from crystalline semiconductor light-emitting diode dies (sometimes referred to as microLEDs), and/or other display. The displays of device 10 may each have an array of pixels configured to display images for a user. The images may contain computer-generated content (sometimes referred to as virtual images, virtual content, or virtual-reality content).

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
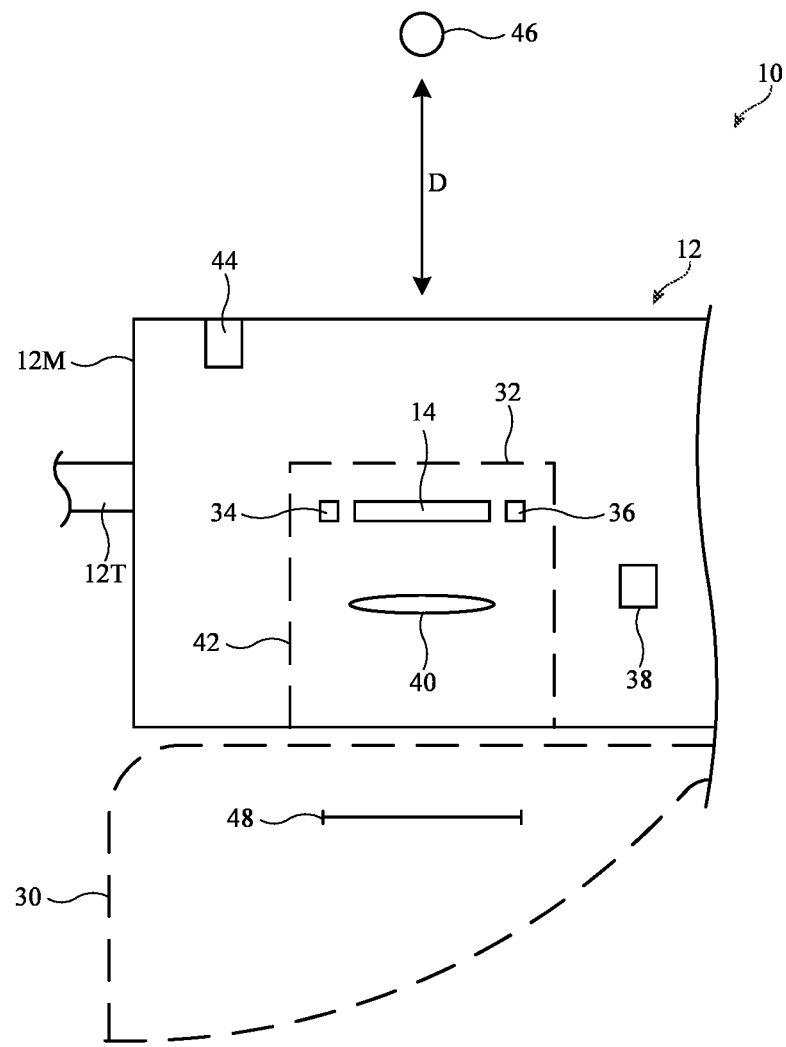
FIG. 2 is a top view of a portion of an illustrative head-mounted device in accordance with an embodiment.

FIG. 2 is a top view of a left-hand portion of an illustrative head-mounted electronic device. As shown in FIG. 2, device 10 may have head-mounted support structures such as head-mounted device housing 12. Housing 12 may include a main housing unit 12M and structures that help a user wear unit 12M on the user's head (e.g., head 30) such as strap 12T. Device 10 may have left and right optical modules (sometimes referred to as lens barrels) or other display support structures such as optical module 32. Module 32 may support display 14 and other components in the interior of housing unit 12M. Display 14 may generate images that are viewable through lens 40 when a user's eye is located in eye box 48. Device 10 has left and right displays that present corresponding left and right images to respective left and right eye boxes. The arrangement of FIG. 2 in which the left portion of device 10 is shown and in which display 14 is being used to present images to left eye box 48 is illustrative.

In addition to display 14 and lens 40, optical module 32 may contain additional components such as components 34 and 36. Components 34 and 36 may form a gaze tracker (sometimes referred to as a gaze tracking sensor, gaze sensor, or eye tracking sensor). In an illustrative configuration, components 34 include light-emitting components such as light-emitting diodes and/or lasers that illuminate the user's eye through lens 40. Components 36 include light sensing circuitry such as an image sensor. The light source formed by components 34 may operate at one or more infrared wavelengths or other suitable wavelengths and the image sensor may be sensitive at visible wavelengths and/or infrared wavelengths. Components 34 (e.g., infrared light-emitting diodes) may be arranged in a ring around lens 40 to create a series of reflections (called glints) on the surface of the user's eye. By processing the images of the user's eye captured with the image sensor (e.g., by processing glint patterns and/or other eye images), the direction in which the user's eye is pointing can be measured. This direction may sometimes be referred to as the user's eye pointing direction, gaze direction, gaze, or direction of gaze.

If desired, device 10 may have front-facing sensors such as sensor 44. Sensors such as sensor 44 may include front-facing cameras (e.g., to capture images of real-world objects in front of device 10), distance sensors (e.g., time-of-flight sensors, depth sensors, radar sensors, etc.), and/or other sensors 16.

Orientation sensors such as illustrative orientation sensor 38 (e.g., an accelerometer, compass, gyroscope, and/or an inertial measurement unit which contains one, two, or all three of these sensors, a visual inertial odometry sensor, etc.) may be used to gather information on the orientation of housing 12 (and therefore information on the orientation of the user's head 30).

During operation, control circuitry 20 may gather real-time information on the orientation of device 10 and can adjust the presentation of images on displays 14 accordingly to create a realistic virtual world for the user. If, as an example, it is determined from sensor 38 that the user is moving head 30 to the right, control circuitry 20 may direct displays 14 to present images that move by a corresponding amount to the left. In this way, the virtual content that is presented to the user appears to stand still relative to the user's head, just as in the real world.

Head orientation and eye orientation (gathered from the gaze sensor) may be analyzed to produce VOR data in real time. For example, control circuitry 20 can use eye orientation information from the gaze sensor and head orientation information from a head (device) orientation sensor such as sensor 38 to compute a VOR gain value. In an illustrative configuration, VOR gain is computed by dividing the change in gaze direction (e.g., eye speed) by the change in head orientation (e.g., head speed). The measured value of VOR gain tends to increase as a function of increasing distance D between the user's eyes and an object being viewed (whether a virtual object or a real-world object such as a real-world object viewed through an optical combiner). By measuring VOR gain, control circuitry 20 can therefore estimate the distance D. This method of determining object distance D may be used even if only a single gaze detector is producing valid output.

Another way in which to determine object distance D that does not rely on both gaze detectors being operable involves the use of the display system depth buffer. When image content is rendered by the display system (control circuitry 20) for displaying on display 14, the display system has information on the depth of each object within the rendered image. This object depth information is stored in memory in control circuitry 20 (e.g., in storage that is sometimes referred to as a depth buffer). By examining the contents of the depth buffer to identify the depth within the scene of an object that is being viewed by a user, the virtual distance D of the object from the viewer can be ascertained.

Historical data of gaze tracker output (sometimes referred to as gaze history or gaze history information) can also be used to help ascertain the direction of gaze and point-of-gaze of the user when one of the gaze trackers is momentarily impaired. If, for example, the user was recently viewing a portion of a scene containing objects that are close to the user, there is an elevated likelihood that the user will be viewing nearby objects in the future.

These different sources of information can be used to complement each other to enable device 10 to perform monocular gaze estimation operations. For example, depth buffer distance estimation tends to be most accurate when the gaze is not at a location in the displayed image that contains an object edge (e.g., a location adjacent to a transition between foreground and background content). When the gaze location is directed towards an object edge, slight uncertainty in gaze direction (measured eye direction angle from the gaze tracker) can lead to relatively large uncertainty in distance estimates. Estimates of object distance from VOR gain measurements, on the other hand, tend to be accurate at small values of D. Historical gaze depth information is most accurate for short time periods following gaze tracker signal loss (e.g., at times that are close to the time at which a gaze tracker's output is first interrupted). Because each of these different monocular gaze estimation sources has overlapping regions of satisfactory accuracy, the use of multiple monocular gaze estimation techniques such as these allows the different sources to be used together to produce accurate gaze values.

In general, any suitable modeling technique may be used to estimate gaze during the momentary impairment of one of the two gaze trackers in device 10. For example, empirical methods such as machine learning techniques may be used to develop a machine learning model (e.g., a machine learning model may be used for the monocular gaze estimation model by pre-training and/or continuously training a learning-network associated with device 10 over a range of suitable different types of visual content, different types of gaze tracker impairment, etc.). If desired, variable weighting schemes may be used.

During monocular gaze estimation, the monocular gaze estimation model may be used to compute the gaze GE associated with the impaired gaze tracker based information from multiple sources (e.g., depth buffer, history, and VOR gain measurements) plus gaze tracker data from the non-impaired gaze tracker.

Figure 3:
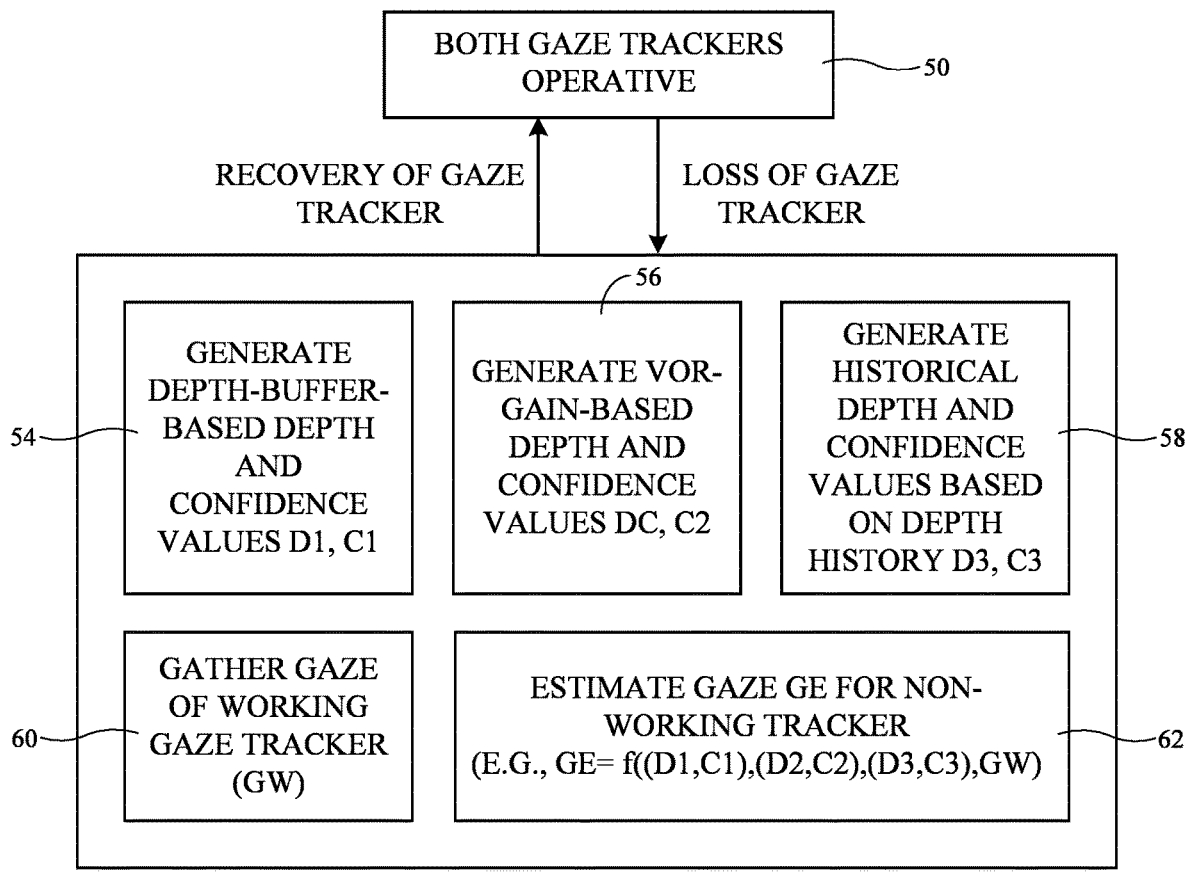
FIG. 3 is a flow chart of illustrative operations involved in operating a system with a head-mounted device in accordance with an embodiment.

FIG. 3 is a diagram showing illustrative operations involved in using device 10.

During the operation of block 50, both the left and right gaze trackers in device 10 are operative (non-impaired) and produce output. Based on the gaze information for the left and right eyes that is measured with the gaze trackers, control circuitry 20 can determine the user's current direction of gaze and point-of-gaze in three dimensions. This information (sometimes referred to as the user's gaze) may be used in implementing a foveated display system (e.g., by regions in the images on the displays in device 10 to provide with locally enhanced resolution), may be used in correcting displayed content for image distortion that varies as a function of gaze (e.g., geometric distortion, chromatic distortion, etc.) and/or may be used for other gaze-tracker-based operations.

In the event that one of the gaze trackers is momentarily impaired, processing may proceed to block 52. During the operations of block 52, control circuitry 20 determines the user's gaze using monocular gaze estimation techniques. In particular, control circuitry 20 may use a monocular gaze estimation function f (e.g., an estimation function that has been determined using machine learning techniques and/or other modeling techniques) to estimate the gaze tracker output GE for the gaze tracker that is momentarily impaired. The estimated gaze information GE and the gaze output of the non-impaired gaze tracker may then be temporarily used in place of the gaze information that would normally be produced by the left and right gaze trackers. Once the impaired gaze tracker has recovered, both gaze trackers may be used together during the operations of block 50.

During the operations of block 52, control circuitry 20 may gather and process gaze information from multiple sources.

During the operations of block 54, control circuitry 20 produces a first estimate of object distance (depth D1) and a corresponding confidence value C1 (confidence that the value of D1 is accurate) based on information in the display system depth buffer. The depth D1 may, for example, correspond to the virtual image depth of a virtual object that is being viewed by the user (e.g., per the gaze of the user determined from the non-impaired gaze tracker). The value of confidence C1 will be lower when the user's gaze is located at an edge of an object (close to a foreground-background transition) and will be higher when located near the center of a foreground object or on a background object at a location that is far from any foreground objects.

During the operations of block 56, control circuitry estimates the object distance for the object being viewed by the user (depth D2) based on measured VOR gain. The value of VOR gain may be measured by measuring the change in angular orientation (rate of change of orientation) for the user's head 30 (e.g., from the orientation of device 10 measured using orientation sensor 38) and by measuring the change in angular orientation (rate of change of orientation) for the user's eye (e.g., from the orientation of the eye corresponding to the non-impaired gaze tacker) and by subsequently calculating the ratio of the of these values (effectively eye speed divided by head speed). The relationship between measured VOR gain value and estimated depth value may be characterized during calibration operations (e.g., during manufacturing or later) and corresponding calibration data may be maintained in a depth versus VOR gain function or look-up table stored in device 10. In addition to determining depth D2 based on VOR gain, the operations of block 56 may involve computing a confidence value C2 that represents the confidence that the D2 value is accurate. The value of C2 will tend to be low when the value of D2 is high and will tend to be high when the value of D2 is low.

During the operation of device 10, the current value of object distance (depth D) corresponding to the user's gaze may be maintained in a circular buffer or other storage. These historical values of depth D may then be used to predict the current value of object distance (depth D3) during the operations of block 58. A confidence value C3 corresponding to the amount of confidence that depth D3 accurately represents the current object distance may also be produced. The value of C3 will tend to be low if the user's gaze is directed near an object edge (e.g., near a foreground-background transition) and/or if the amount of time lapsed from the end of the historical data record is long (e.g., if the amount of time that the gaze tracker has been impaired is long), whereas the value of C3 will tend to be high if the user is gazing away from an object edge and/or the amount of time that has elapsed since the last two-gaze-tracker historical data point was gathered is short.

The gaze of the working gaze tacker (e.g., gaze GW, corresponding to the output of the gaze tracker in device 10 that is not impaired) may be gathered during the operations of block 60.

During the estimation operations of block 62, the gaze output GE of the impaired gaze tracker may be determined using monocular gaze estimation function f. The function f may take as inputs the data gathered during the operations of blocks 54, 56, 58, and 60). In particular, estimated gaze value GE may be based on the values of D1 and C1 (e.g., the depth-buffer-derived depth estimate and confidence estimate), based on the values of D2 and C2 (e.g., the VOR-gain-based depth estimate and confidence estimate), based on the values of D3 and C3 (e.g., the historical depth estimate and confidence estimate), and based on the value of gaze GW from the non-impaired gaze tracker. Each of the depth estimation methods may also include its own reliability measurement, and may thus be associated with an additional metric along with the estimate: the confidence. The confidence value of each depth estimate may be used to weight that depth estimate. If, for example, the impaired gaze tracker has been impaired for a relatively long amount of time, the historical estimate of depth (e.g., value D3) can be de-weighted or even ignored completely. If, on the other hand, the impairment time is very short, the value of D3 can be weighted heavily. The estimate of D1 from block 54 can be weighted lightly when C1 is low (e.g., when the user is viewing the edge of an object) and can be weighted more strongly when C1 is high. The value of D2 from block 56 can be given a relatively high weight when the magnitude of D2 is small (e.g., when confidence value C2 is high because the viewed object depth is small) and given a relatively low weight when the magnitude of D2 is large (e.g., when confidence value C2 is low). Once the depth of the object has been estimated (e.g., using weighting), the object depth and output of the non-impaired gaze tracker GW can be used together to estimate GE (the output of the impaired gaze tracker). Once GE has been determined based on the output of the non-impaired gaze tracker and the estimates of blocks 54, 56, and 58, the gaze of the user (e.g., the values of GE and GW taken together) may be used in operating the displays in device 10 (e.g., this gaze information may be used to implement a foveated display scheme, may be used to correct for image distortion, etc.). When the impaired gaze sensor recovers and is again able to measure the user's gaze, operations may return to block 50.

If desired, a learning-based network may be used in assigning weights for the monocular gaze estimation function. The learning-based network may be used to assign these weights in an automatic manner, based on the observations obtained during a training phase.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device, comprising:
   a head-mounted support structure;
   first and second displays and corresponding first and second lenses configured to present respective first and second images to first and second eye boxes;
   a first gaze tracker configured to gather gaze information from the first eye box;
   a second gaze tracker configured to gather gaze information from the second eye box; and
   control circuitry configured to:
      in a first mode in which the first and second gaze trackers are not impaired, operate the first and second displays using the gaze information from the first and second gaze trackers; and
      in a second mode in which the first gaze tracker is impaired and the second gaze tracker is not impaired, operate the first and second displays using the gaze information from the second gaze tracker and an object depth estimate corresponding to an object on the first and second displays.

2. The electronic device defined in claim 1 wherein, in the second mode, the control circuitry is configured to:
   generate the object depth estimate based on depth buffer information; and
   use the object depth estimate generated based on the depth buffer information in producing gaze information unavailable from the first gaze tracker.

3. The electronic device defined in claim 2 wherein, in the second mode, the control circuitry is configured to:
   generate the object depth estimate based on vestibulo-ocular-reflex gain information; and
   use the object depth estimate generated based on the vestibulo-ocular-reflex gain information in producing the gaze information unavailable from the first gaze tracker.

4. The electronic device defined in claim 3 wherein, in the second mode, the control circuitry is configured to:
   generate the object depth estimate based on historical object depth information; and
   use the object depth estimate generated based on the historical object depth information in producing the gaze information unavailable from the first gaze tracker.

5. The electronic device defined in claim 4 wherein, in the second mode, the control circuitry is configured to generate the object depth estimate using confidence values associated respectively with object depths estimates produced using the depth buffer information, the vestibulo-ocular-reflect gain information, and the historical object depth information.

6. The electronic device defined in claim 4 wherein, in the second mode, the control circuitry is configured to generate the object depth estimate using a monocular gaze estimation model produced using a pre-trained or continuously trained learning network.

7. The electronic device defined in claim 4 wherein, in the second mode, the control circuitry is configured to generate the object depth estimate using gaze tracker output from the second gaze tracker.

8. The electronic device defined in claim 1 wherein, in the second mode, the control circuitry is configured to generate the object depth estimate based on historical object depth information.

9. The electronic device defined in claim 8 wherein, in the second mode, the control circuitry is configured to generate the object depth estimate based on vestibulo-ocular-reflex gain information.

10. The electronic device defined in claim 9 further comprising an orientation sensor, wherein, in the second mode, the control circuitry is configured to generate the vestibulo-ocular-reflex gain information using the second gaze tracker and the orientation sensor.

11. The electronic device defined in claim 1 further comprising a distance sensor, wherein the control circuitry is configured to generate the object depth estimate using the distance sensor.

12. The electronic device defined in claim 1 wherein, in the second mode, the control circuitry is configured to produce an object depth estimate confidence value based on depth buffer information.

13. The electronic device defined in claim 1 wherein, in the second mode, the control circuitry is configured to produce an object depth estimate confidence value based on vestibulo-ocular-reflex gain information.

14. The electronic device defined in claim 1 wherein, in the second mode, the control circuitry is configured to produce an object depth estimate confidence value based on historical object depth information.

15. The electronic device defined in claim 1 further comprising a camera configured to capture a real-world image, wherein the first and second images include part of the real-world image.

16. The electronic device defined in claim 1 wherein the object on the first and second displays comprises a computer-generated object.

17. The electronic device defined in claim 1 wherein, in the second mode, the control circuitry is configured to display foveated image content on the first and second displays based on the gaze information from the second gaze tracker and the object depth estimate.

18. An electronic device, comprising:
a head-mounted support structure;
first and second displays and corresponding first and second lenses configured to present respective first and second images to first and second eye boxes;
an orientation sensor configured to gather orientation information on the head-mounted support structure;
a first gaze tracker configured to gather gaze information from the first eye box;
a second gaze tracker configured to gather gaze information from the second eye box; and
control circuitry configured to:
in a first mode in which the first and second gaze trackers are not impaired, display content on the first and second displays using the gaze information from the first and second gaze trackers; and
in a second mode in which the first gaze tracker is impaired and the second gaze tracker is not impaired, display content on the first and second displays using the gaze information from the second gaze tracker and an object depth estimate corresponding to an object on the first and second displays, wherein the object depth estimate is generated by the control circuitry using eye orientation information from the second gaze tracker and using the head-mounted support structure orientation information from the orientation sensor.

19. The electronic device defined in claim 18 wherein, in the second mode, the control circuitry is configured to produce the object depth estimate using information from a display depth buffer.

20. The electronic device defined in claim 19 wherein, in the second mode, the control circuitry is configured to produce the object depth estimate using historical depth information.

21. An electronic device, comprising:
a head-mounted support structure;
first and second displays and corresponding first and second lenses configured to present respective first and second images to first and second eye boxes;
an orientation sensor configured to gather orientation information on the head-mounted support structure;
a first gaze tracker configured to gather gaze information from the first eye box;
a second gaze tracker configured to gather gaze information from the second eye box; and
control circuitry configured to:
in a first mode in which the first and second gaze trackers are not impaired, display foveated and distortion-corrected image content on the first and second displays using the gaze information from the first and second gaze trackers; and
in a second mode in which the first gaze tracker is impaired and the second gaze tracker is not impaired, present foveated and distortion-corrected image content on the first and second displays using the gaze information from the second gaze tracker and an object depth estimate corresponding to an object on the first and second displays.

22. The electronic device defined in claim 21 wherein, in the second mode, the control circuitry is configured to generate the object depth estimate using depth buffer information, using vestibulo-ocular-reflex gain information based on the orientation information and the gaze information from the second eye box, and using historical object depth information.

* * * * *